United States Patent
Smolyanskiy et al.

(10) Patent No.: US 11,080,590 B2
(45) Date of Patent: Aug. 3, 2021

(54) STEREO DEPTH ESTIMATION USING DEEP NEURAL NETWORKS

(71) Applicant: NVIDIA Corporation, San Jose, CA (US)

(72) Inventors: Nikolai Smolyanskiy, Seattle, WA (US); Alexey Kamenev, Bellevue, WA (US); Stan Birchfield, Sammamish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 156 days.

(21) Appl. No.: 16/356,439

(22) Filed: Mar. 18, 2019

(65) Prior Publication Data

US 2019/0295282 A1    Sep. 26, 2019

Related U.S. Application Data

(60) Provisional application No. 62/646,148, filed on Mar. 21, 2018.

(51) Int. Cl.
*G06N 3/04* (2006.01)
*G06N 3/08* (2006.01)
(Continued)

(52) U.S. Cl.
CPC ............ *G06N 3/0454* (2013.01); *G01S 17/86* (2020.01); *G01S 17/89* (2013.01); *G06K 9/6215* (2013.01);
(Continued)

(58) Field of Classification Search
USPC .................................. 382/154–224, 276–293
See application file for complete search history.

(56) References Cited

U.S. PATENT DOCUMENTS 10,580,158 B1 *   3/2020   Mousavian ........ G06K 9/00201
2007/0182528 A1   8/2007   Breed et al.
(Continued)

FOREIGN PATENT DOCUMENTS

EP          2384009 A2     11/2011
WO      2018/002910 A1      1/2018

OTHER PUBLICATIONS

R. S. Allison, B. J. Gillam, and E. Vecellio. Binocular depth discrimination and estimation beyond interaction space. Journal of Vision, 9(1), Jan. 2009.
(Continued)

*Primary Examiner* — Marcellus J Augustin
(74) *Attorney, Agent, or Firm* — Shook, Hardy & Bacon, L.L.P.

(57) ABSTRACT

Various examples of the present disclosure include a stereoscopic deep neural network (DNN) that produces accurate and reliable results in real-time. Both LIDAR data (supervised training) and photometric error (unsupervised training) may be used to train the DNN in a semi-supervised manner. The stereoscopic DNN may use an exponential linear unit (ELU) activation function to increase processing speeds, as well as a machine learned argmax function that may include a plurality of convolutional layers having trainable parameters to account for context. The stereoscopic DNN may further include layers having an encoder/decoder architecture, where the encoder portion of the layers may include a combination of three-dimensional convolutional layers followed by two-dimensional convolutional layers.

20 Claims, 11 Drawing Sheets

(51) Int. Cl.

| | | |
|---|---|---|
| *G06N 3/10* | (2006.01) | |
| *G01S 17/00* | (2020.01) | |
| *G06T 7/00* | (2017.01) | |
| *G06T 7/593* | (2017.01) | |
| *G06T 1/20* | (2006.01) | |
| *G06K 9/62* | (2006.01) | |
| *G06N 3/063* | (2006.01) | |
| *G01S 17/86* | (2020.01) | |
| *G01S 17/89* | (2020.01) | |

(52) U.S. Cl.
CPC ........... *G06N 3/0481* (2013.01); *G06N 3/063* (2013.01); *G06N 3/084* (2013.01); *G06N 3/088* (2013.01); *G06T 1/20* (2013.01); *G06T 7/593* (2017.01); *G06T 2207/10012* (2013.01); *G06T 2207/10052* (2013.01); *G06T 2207/20084* (2013.01)

(56) References Cited

U.S. PATENT DOCUMENTS

| | | | |
|---|---|---|---|
| 2017/0371340 A1 | 12/2017 | Cohen et al. | |
| 2019/0102668 A1* | 4/2019 | Yao | G06K 9/00 |
| 2019/0213481 A1* | 7/2019 | Godard | G06N 3/0454 |
| 2020/0013176 A1* | 1/2020 | Kang | G06N 3/0454 |
| 2021/0064980 A1* | 3/2021 | Heinrich | G06K 9/00791 |

OTHER PUBLICATIONS

D. Borland and R. M. Taylor II. Rainbow color map (still) considered harmful. IEEE Computer Graphics and Applications, 27(2), Mar. 2007.
D.-A. Clevert, T. Unterthiner, and S. Hochreiter. Fast and accurate deep network learning by exponential linear units (ELUs). In ICLR, 2016.
R. H. Cormack. Stereoscopic depth perception at far observation distances. Perception & Psychophysics, 35(5):423428, Sep. 1984.
D. Eigen, C. Puhrsch, and R. Fergus. Depth map prediction from a single image using a multi-scale deep network. In NIPS, 2014.
R. Garg, V. K. BG, G. Carneiro, and I. Reid. Unsupervised CNN for single view depth estimation: Geometry to the rescue. In ECCV, 2016.
A. Geiger, P. Lenz, C. Stiller, and R. Urtasun. Vision meets robotics: The KITTI dataset. IJRR, 2013.
S. Gidaris and N. Komodakis. Detect, replace, refine: Deep structured prediction for pixel wise labeling. In arXiv 1612.04770, 2016.
C. Godard, O. M. Aodha, and G. J. Brostow. Unsupervised monocular depth estimation with left-right consistency. In CVPR, 2017.
R. L. Gregory. Eye and brain. London: World University Library, 1966.
F. Gürley and A. Geiger. Displets: Resolving stereo ambiguities using object knowledge. In CVPR, 2015.
K. He, X. Zhang, S. Ren, and J. Sun. Deep residual learning for image recognition. In CVPR, 2016.
P.B. Hibbard, A. E. Haines, and R. L. Hornsey. Magnitude, precision, and realism of depth perception in stereoscopic vision. Cognitive Research: Principles and Implications, 2(1), 2017.
M. Jaderberg, K. Simonyan, A. Zisserman, and K. Kavukcuoglu. Spatial transformer networks. In NIPS, 2015.
A. Kendall, H. Martirosyan, S. Dasgupta, P. Henry, R. Kennedy, A. Bachrach, and A. Bry. End-to-end learning of geometry and context for deep stereo regression. In ICCV, 2017.
P. Kovesi. Good color maps: How to design them. In arXiv 1509.03700, 2015.
Y. Kuznietsov, J. Stuckler, and B. Leibe. Semi-supervised deep learning for monocular depth map prediction. In CVPR, 2017.
C. A. Levin and R. N. Haber. Visual angle as a determinant of perceived interobject distance. Perception & Psychophysics, 54(2):250-259, Mar. 1993.
Z. Liang, Y. Feng, Y. Guo, H. Liu, L. Qiao, W. Chen, L. Zhou, and J. Zhang. Learning deep correspondence through prior and posterior feature constancy. In arXiv:1712.01039, 2017.
F. Liu, C. Shen, G. Lin, and I. Reid. Learning depth from single monocular images using deep convolutional neural fields. PAMI, 2015.
N. Mayer, E. Ilg, P. Hausser, P. Fischer, D. Cremers, A. Dosovitskiy, and T. Brox. A large dataset to train convolutional networks for disparity, optical flow, and scene flow estimation. In CVPR, 2016.
S. Palmisano, B. Gillam, D. G. Govan, R. S. Allison, and J. M. Harris. Stereoscopic perception of real depths at large distances. Journal of Vision, 10(6), Jun. 2010.
J. Pang, W. Sun, J. Ren, C. Yang, and Y. Qiong. Cascade residual learning: A two-stage convolutional neural network for stereo matching. In arXiv 1708.09204, 2017.
A. Seki and M. Pollefeys. Patch based confidence prediction for dense disparity map. In British Machine Vision Conference (BMVC), 2016.
A. Seki and M. Pollefeys. SGM-Nets: Semi-global matching with neural networks. In CVPR, 2017. [26] A. Shaked and L. Wolf. Improved stereo matching with constant highway networks and reflective loss. In arXiv 1701.00165, 2016.
A. Shaked and L. Wolf. Improved stereo matching with constant highway networks and reflective loss. In arXiv 1701.00165, 2016.
Z. Wang, A. C. Bovik, H. R. Sheikh, and E. P. Simoncelli. Image quality assessment: From error visibility to structural similarity. IEEE Transactions on Image Processing, 13(4):600-612, Apr. 2004.
J. Žbontar and Y. LeCun. Stereo matching by training a convolutional neural network to compare image patches. JMLR, 17(65):1-32, 2016.
H. Zhao, O. Gallo, I. Frosio, and J. Kautz. Loss functions for image restoration with neural networks. IEEE Transactions on Computational Imaging, 3(1), Mar. 2017.
Y. Zhong, Y. Dai, and H. Li. Self-supervised learning for stereo matching with self-improving ability. In arXiv 1709.00930, 2017.
Zhong, Yiran et al: "Self-Supervised Learning for Stereo Matching with Self-Improving Ability", Arxiv.org, Cornell University Library, 201 Olin Library Cornell University Ithaca, NY 14853, Sep. 4, 2017. 13 pages.
Pang, Jiahao et al: "Cascade Residual Learning: A Two-Stage Convolutional Neural Network for Stereo Matching", 2017 IEEE International Conference on Computer Vision Workshops (ICCVW), IEEE, Oct. 22, 2017, pp. 878-886. 9 pages.
Godard, Clement et al: "Unsupervised Monocular Depth Estimation with Left-Right Consistency", IEEE Computer Society Conference on Computer Vision and Pattern Recognition. Proceedings, IEEE Computer Society, US, Jul. 21, 2017. pp. 6602-6611. 10 pages.
International Search Report and Written Opinion dated Nov. 7, 2019 in International Patent Application No. PCT/US2019/022753. 22 pages.
Kendall, Alex et al: "End-to-end Learning of Geometry and Context for Deep Stereo Regression" Arxiv.org, Cornell University Library, 201 Olin Library Cornell University Ithaca, NY 14853, Mar. 13, 2017. 10 pages.
Jayaraman, A. et al., "Creating 3D Virtual Driving Environments for Simulation-Aided Development of Autonomous Driving and Active Safety", SAE Technical Paper Series, vol. 1, pp. 1-3 (Mar. 28, 2017) (English Abstract Submitted).
International Preliminary Report on Patentability received for PCT Application No. PCT/US2019/022753, dated Oct. 1, 2020, 14 pages.
International Preliminary Report on Patentability received for PCT Application No. PCT/US2019/024400, dated Oct. 8, 2020, 10 pages.

* cited by examiner

120 —

| MODEL 122 | FEATURE EXTRACTION 124 | COST VOLUME 126 | MATCHING 128 | UP-SAMPLING 130 | AGGREGATOR 132 |
|---|---|---|---|---|---|
| ML ARGMAX | $(1\downarrow_1, 8(2C_+), 1C)$ | CONCAT. (4D) | $(4\downarrow_3, 2C, 4\uparrow_{1+})$ | $1\uparrow_1$ | ML-ARGMAX (5C) |
| BASELINE | $(1\downarrow_1, 8(2C_+), 1C)$ | CONCAT. (4D) | $(4\downarrow_3, 2C, 4\uparrow_{1+})$ | $1\uparrow_1$ | SOFT-RGMAX |
| CORRELATION | $(1\downarrow_1, 8(2C_+), 1C)$ | CORRELATION (3D) | $(4\downarrow_3, 2C, 4\uparrow_{1+})$ | $1\uparrow_1$ | SOFT-ARGMAX |
| NO BOTTLENECK | $(1\downarrow_1, 8(2C_+), 1C)$ | CONCAT. (4D) | (2C) | $1\uparrow_1$ | SOFT-ARGMAX |
| SINGLE TOWER | $(1\downarrow_1, 8(2C_+), 1C)$ | CONCAT. (4D, SINGLE) | $(4\downarrow_3, 2C, 4\uparrow_{1+})$ | $1\uparrow_1$ | SOFT-ARGMAX |
| SMALL / TINY | (5C) | CONCAT. (4D) | $(2\downarrow_3, 2C, 2\uparrow_{1+})$ | $1\uparrow_1$ | SOFT-ARGMAX |

| MODEL 136 | SIZE 138 | LIDAR AND PHOTOMETRIC 140 |
|---|---|---|
| NO BOTTLENECK | 0.2M | 14.5% |
| CORRELATION | 2.7M | 12.9% |
| SMALL | 1.8M | 9.8% |
| TINY | 0.5M | 11.9% |
| SINGLE TOWER | 2.8M | 10.1% |
| BASELINE | 2.8M | 8.8% |
| ML ARGMAX | 3.1M | 8.7% |

| MODEL 144 | RESOLUTION 146 | TITAN XP 148 | | GTX 1060 150 | | TX2 152 |
|---|---|---|---|---|---|---|
| | | TF | OPT | TF | OPT | OPT |
| BASELINE | 1025 x 321 x 136 | 950 | 650 | OOM | 1900 | 11000 |
| TINY | 1025 x 321 x 96 | 800 | 450 | 2500 | 1150 | 7800 |
| SMALL | 513 x 161 x 48 | 280 | 170 | 550 | 300 | 990 |
| TINY | 513 x 161 x 48 | 75 | 42 | 120 | 64 | 370 |

FIGURE 1D

| MODEL 308 | LIDAR 310 | PHOTOMETRIC 312 | LIDAR AND PHOTOMETRIC 314 |
|---|---|---|---|
| MONODEPTH | - | 32.8% | - |
| NO BOTTLENECK | 21.3% | 18.6% | 14.5% |
| CORRELATION | 14.6% | 13.3% | 12.9% |
| BASELINE | 15.0% | 12.9% | 8.8% |

STEREO DEPTH ESTIMATION USING DEEP NEURAL NETWORKS

CROSS-REFERENCE TO RELATED APPLICATIONS

This application claims the benefit of U.S. Provisional Application No. 62/646,148, filed on Mar. 21, 2018, which is hereby incorporated by reference in its entirety.

BACKGROUND

Depth estimation plays an important role in computer vision techniques, especially in technology areas such as autonomous driving, advanced driver assistance systems (ADAS), unmanned aerial vehicle (UAV) control, robotics, virtual reality, and augmented reality, to name a few. For example, depth estimation may be useful for understanding a real-world environment for navigation, obstacle avoidance, localization, mapping, reconstruction of the real-world environment in a virtual world, and/or other uses.

Conventional approaches to depth estimation have deployed deep neural networks (DNNs) that use either monocular or stereoscopic images as input to compute depth information as an output. With respect to monocular based DNNs, monocular based DNNs suffer from inaccuracies in depth information because there is only a single frame of reference. As a result, a DNN using monocular images may be trained to only detect objects and associated behaviors that were included in the training data (e.g., the monocular images). For example, the DNN may be unable to accurately detect depth for a pedestrian running, or jumping, or may be unable to accurately predict depth for a larger vehicle, or a smaller vehicle, or another behavior, vehicle, or object that is not within the types of behaviors, vehicles, or objects included within the training data. This may be a result of the DNN learning to predict distances based on relative sizes of known objects performing known behaviors within the training data (e.g., a larger vehicle at a further distance may appear smaller in the monocular image, and thus may be predicted to be further away by the DNN). These inaccurate results may lead to a lack of efficacy of the DNN in actual deployment, especially where safety is an important factor and depth information is used by the system to perform safely (e.g., for autonomous vehicles, UAVs, robots, etc.)

In addition, DNNs trained on monocular image data may need to be separately trained for the geographic regions in which they will be deployed because the DNN's may be trained to identify specific vehicles and behaviors in specific environments. As a result, vehicles, behaviors, and environments in one region may not be similar enough to another region, thereby requiring separate training for each region. For example, a DNN that is to be used in Germany may need to be trained using data from Germany, and a DNN that is to be used in Portland, may need to be trained using data from Portland. As a result, training of monocular DNNs may not be universal, and thus may require separate training in different localities—thereby increasing the computing requirements necessary for deploying the DNN in multiple locations.

As indicated herein, other conventional approaches have used stereoscopic images captured concurrently as input to a DNN to generate depth information. These conventional approaches use either only LIDAR data or only photometric consistency to train the DNN. Where only sparse LIDAR data is used to train the DNN, the outputs (e.g., disparity maps) of the DNN may be inaccurate (e.g., missing detections of some objects completely) and noisy. This may be a result of the sparse nature of LIDAR data. In addition, because LIDAR data may be representative of unwanted artifacts—such as lines—the training data may need to be augmented to train the DNN not to identify these artifacts in the output, which may increase the noise of the output. In addition, the output may need to undergo additional filtering and post-processing in order to smooth the results, thereby increasing the processing requirements and slowing the run-time of the system deploying the DNN.

With respect to the architecture of conventional stereoscopic DNNs, rectified linear unit (ReLU) activation functions may be used, which may necessitate batch normalization layers (e.g., on outputs of convolutional layers prior to being input to the ReLU) thereby increasing the overall size of the DNN. In addition, within matching layers of these conventional DNNs, only fully three-dimensional (3D) convolutions may be used which may further increase the overall size of the DNN. By increasing the size of the DNN (e.g., the number of layers and/or nodes), the processing requirements and the run-time may be increased, thereby decreasing the likelihood of accurate and effective deployment of the DNN in real-time.

In addition, the conventional DNNs—in order to generate final disparity values for each of the input images—may use a softmax function (alternatively referred to as a softargmax function) on an output of matching layers of the DNN (e.g., layers of the DNN that perform matching between pixels of left and right images). However, a softmax function may have the drawback of assuming that all context has already been taken into account, which will not always be the case. As such, where repeatable textures appear, the outputs of the softmax function may include false positives and maximums where there should not be maximums, thereby reducing the accuracy of the DNN. As a result, the depth values determined from the final disparity values may be inaccurate, which may reduce the accuracy and thus the safety of the system deploying the DNN.

SUMMARY

Embodiments of the present disclosure relate to stereo depth estimation using deep neural networks. Systems and methods are disclosed that may use semi-supervised training to train a deep neural network to predict depth from stereoscopic images.

In contrast to conventional systems, such as those described above, the present disclosure includes stereoscopic deep neural networks (DNN) that may produce comparatively more accurate and reliable results while being deployable in real-time. For example, both LIDAR data (supervised training) and photometric error (unsupervised training) may be used to train the DNN in a semi-supervised manner By using both photometric error and LIDAR data, the benefits of each may be learned by the DNN while the drawbacks to each may be mitigated by the other.

Other benefits of the stereoscopic DNNs of the present disclosure may relate to the network architecture. For example, instead of ReLU activation functions used in conventional DNNs, an exponential linear unit (ELU) activation function may be used by a DNN of the present disclosure. By using the ELU activation function, the DNN may require comparatively less layers (e.g., may not require batch normalization layers), thus decreasing the overall size of the DNN and resulting in faster run-times while increasing accuracy. In addition, instead of using a soft argmax function, a machine learned (ML) argmax function—including a plurality of convolutional layers with trainable parameters (e.g., via backpropagation)—may be used by the DNN to account for context. Further, layers of the DNN may include an encoder/decoder "bottleneck" architecture, where the encoder portion of the matching layers includes a combination of three-dimensional (3D) convolutional layers followed by two-dimensional (2D) convolutional layers—as opposed to conventional systems that use only 3D convolutional layers. By reducing the number of 3D convolutional layers and replacing them with 2D convolutional layers, less processing may be required without sacrificing accuracy.

BRIEF DESCRIPTION OF THE DRAWINGS

The present systems and methods for stereo depth estimation using deep neural networks are described in detail below with reference to the attached drawing figures, wherein:

FIG. 1B is a table of example architectures for machine learning models, in accordance with some embodiments of the present disclosure;

FIG. 1C is a table comparing accuracy of different architectures for machine learning models, in accordance with some embodiments of the present disclosure;

FIG. 1D is a table comparing run-time of different architectures for machine learning models on various graphics processing units, in accordance with some embodiments of the present disclosure;

DETAILED DESCRIPTION

Figure 1A:
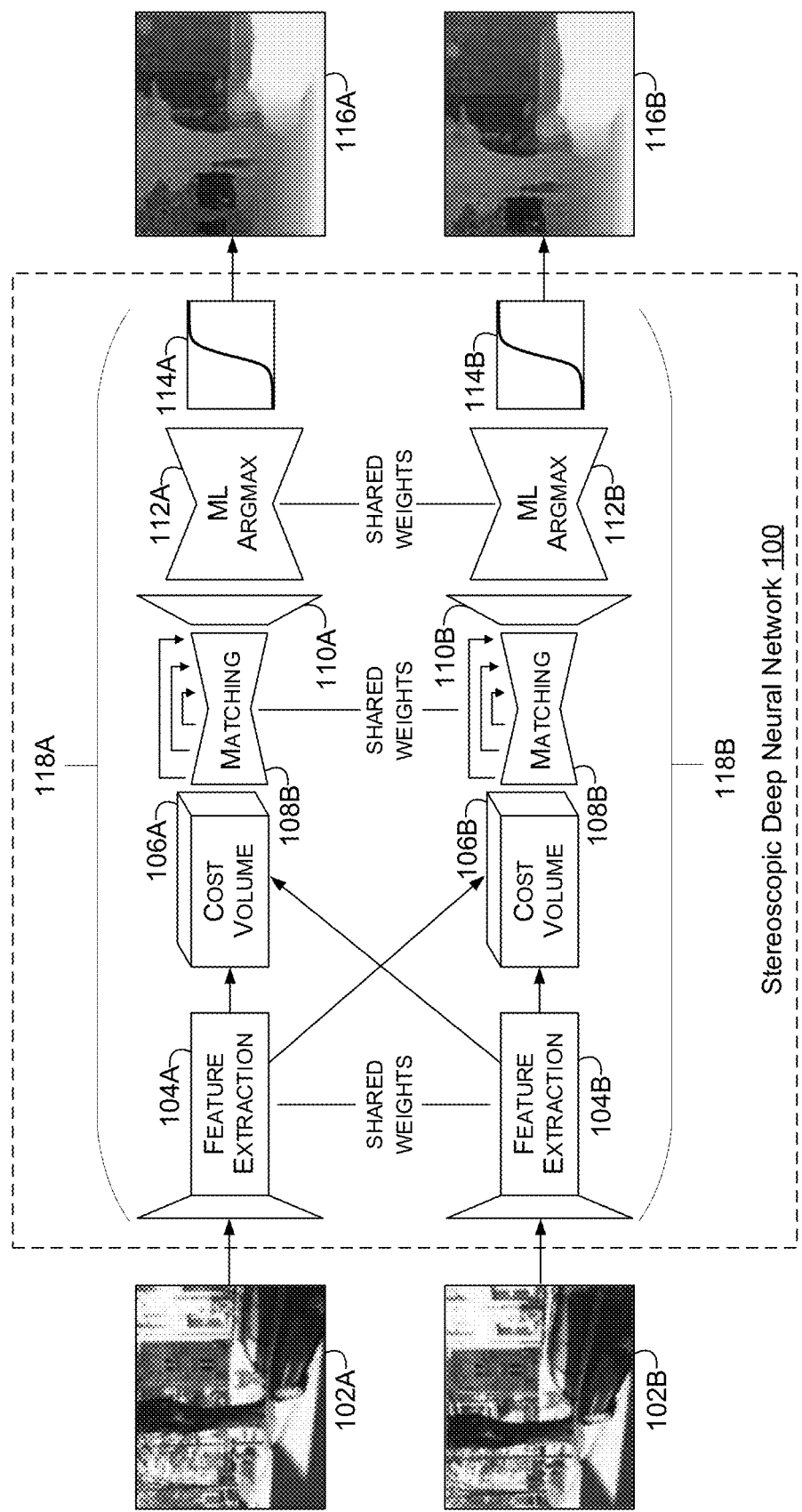
FIG. 1A is an illustration of a stereoscopic deep neural network for depth estimation using stereoscopic images, in accordance with some embodiments of the present disclosure.

Systems and methods are disclosed related to stereo depth estimation using deep neural networks. The present disclosure may be described with respect to an example autonomous vehicle 500 (alternatively referred to herein as "vehicle 500" or "autonomous vehicle 500"), an example of which is described in more detail herein with respect to FIGS. 5A-5D. However, this is not intended to be limiting. For example, and without departing from the scope of the present disclosure, the systems, methods, and/or processes described herein may be applicable to non-autonomous vehicles, robots, unmanned aerial vehicles, virtual reality (VR) systems, augmented reality (AR) systems, and/or any other type of technology that may use depth information.

Stereoscopic Deep Neural Network Architecture

In contrast to conventional systems, such as those described above, the present disclosure provides for stereoscopic deep neural networks (DNN) that may produce comparatively more accurate and reliable results while being deployable in real-time. Benefits of the stereoscopic DNNs of the present disclosure may relate to the network architecture. For example, a DNN may not include any rectified linear unit (ReLU) activation functions, thereby removing the need for batch normalization layers and reducing the overall size and computing requirements for deployment of the DNN as compared to conventional stereo DNNs. Instead of ReLU activation functions, an exponential linear unit (ELU) activation function may be used by a DNN of the present disclosure. By using the ELU activation function, the DNN may require comparatively less layers, thus decreasing the overall size of the DNN, resulting in faster run-times, and increasing accuracy.

In addition, instead of using a soft argmax function (alternatively referred to as a softmax function), a machine learned (ML) argmax function may be used by a DNN of the present disclosure. The ML argmax function may include a plurality of convolutional layers and may include trainable parameters (e.g., trainable using backpropagation) in order to account for context, unlike softmax activation functions. In addition, in some examples, the ML argmax function may include an encoder/decoder "bottleneck" (e.g., convolutional layers followed by deconvolutional layers) architecture, that may further increase the processing speeds of the DNN.

Further, matching layers of a DNN may further include an encoder/decoder "bottleneck" architecture, where the encoder portion of the matching layers includes a combination of three-dimensional (3D) convolutional layers followed by two-dimensional (2D) convolutional layers, as opposed to conventional systems that use only 3D convolutional layers. By reducing the number of 3D convolutional layers and replacing them with 2D convolutional layers, less processing may be required without sacrificing accuracy. For example, because one or more 3D convolutional layers may be still be used, the benefits of the 3D convolutional layers may still be realized, and using the 2D convolutional layers may serve to reduce the size of the DNN and the compute requirements for the DNN.

The outputs of a DNN in accordance with the present disclosure may include disparity maps corresponding to each of the input images, and the disparity maps may be used to calculate depth in the field of view of the sensors (e.g., the stereo cameras). The depth information may be useful for a robot, an autonomous vehicle, a drone, a virtual reality system, an augmented reality system, and/or another object or system when navigating through space.

Now referring to FIG. 1A, FIG. 1A is an illustration of a stereoscopic deep neural network 100 for depth estimation using stereoscopic images, in accordance with some embodiments of the present disclosure. The stereoscopic deep neural network 100 may alternatively be referred to herein as "DNN 100." The DNN 100 may generate disparity maps (e.g., disparity map 116A and disparity map 116B) based on input data—such as sensor data (e.g., stereoscopic image data representative of an image 102A and an image 102B). The input data may include data representative of the images 102 generated from a stereoscopic camera (e.g., one or more stereo cameras 568) of the vehicle 500, or another object (e.g., a robot, a drone, a VR system, an AR system, etc.). In some examples, the image 102A may include a left image (e.g., from a left image sensor of a stereoscopic camera) and the image 102B may include a right image (e.g., from a right image sensor of a stereoscopic camera). The images 102 may have a size of H×W×C, where H is a spatial height of the image, W is a spatial width of the image, and C is the number of input channels (e.g., without limitation, C may be equal to 3). In some examples, each of the images may be resized prior to input to the DNN 100. For a non-limiting example, the images may be resized to 1024× 320. The images 102 may be of any color space, including but not limited to, RGB, HSL, HSV, YUV, YIQ, YDbDr, CIE, etc.

The stereoscopic camera may be calibrated such that disparity values between left and right images of the camera have known depth value conversions. In some non-limiting examples, equation (1), below, may be used to determine depth values from disparity values:

$$Z = fB/d \qquad (1)$$

where Z is the depth for a given pixel, f is focal length of a stereo camera, B is a baseline distance between a center of a first lens and a center of a second lens of the stereo camera, and d is disparity.

As such, disparity values associated with pixels from the disparity maps 116 may be converted to depth values (e.g., using equation (1), above). The depth values may then be used by any of a number of components of the vehicle 500, or another object or system. The components of the vehicle may include components from any layers of an autonomous driving software stack (e.g., world model management layers, perception layers, planning layers, control layers, obstacle avoidance layers, actuation layers, etc.). For example, the depth values may be used to help the vehicle 500 navigate a physical environment based on an understanding of a distance of objects from the vehicle 500 in the environment.

The DNN 100 may include a first stream or tower 118A (e.g., a left image stream) corresponding to the first image 102A and a second stream or tower 118B (e.g., a right image stream) corresponding to the second image 102B. For example, the first stream 118A and the second stream 118B may be executed in parallel to generate or compute the disparity maps 116 from the images 102. In some examples, as indicated in FIG. 1A, layers or sets of layers from the first stream 118A may share weights or other parameters with corresponding layers or sets of layers from the second stream 118B. The corresponding layers or sets of layers may share the weights vertically (e.g., between layers of the first stream 118A and layers of the second stream 118B). In addition to vertical sharing of weights, in some examples, the weights may be shared horizontally (e.g., between layers of the first stream 118A and other layers of the first stream 118A, and between layers of the second stream 118B and other layers of the second stream 118B).

Table 120 of FIG. 1B may include different architectures for the DNN 100, and more specifically may include different architectures for different features of the DNN 100. For example, the architecture of feature extraction layers 104A and 104B may be indicated by feature extraction column 124 of FIG. 1B, the architecture of cost volume layers 106A and 106B may be indicated by cost volume column 126 of FIG. 1B, the architecture of matching layers 108A and 108B may be indicated by matching column 128, the architecture of up-sampling layers 110A and 110B may be indicated by up-sampling column 130, the architecture of aggregator layers 112A and 112B may be indicated by aggregator column 132, and so on. The different architectures of FIG. 1B may be for example purposes only, and are not intended to be limiting. For example, architectures of one row in a column of the table 120 may be substituted with another row in the same column without departing from the scope of the present disclosure. In addition, different architectures may be contemplated other than those included in the table 120 without departing from the scope of the present disclosure. For example, additional or alternative layers or sets of layers (e.g., another or alternative column for the table 120) may be used depending on the embodiment.

The notation of the table 120 is mBk, where m is the number of blocks, B is the type of block, and k is a number of layers in the block. For example, $1\downarrow_1$ means a single down-sampling layer, $1\uparrow_1$ means a single up-sampling layer, 2C means two convolutional layers, and so on. The subscript $_+$ indicates a residual connection, so $8(2C_+)$ means eight superblocks, where each superblock includes two blocks of single convolutional layers that accept residual connections.

Although the description herein may refer primarily to the ML argmax model of the first row of the table 120, the other models in model column 122 may also be used. For example, each of the models—other than the ML argmax model—may use a soft argmax (or softmax) activation function as the aggregator at the aggregator layers 112 of the DNN 100. In some examples, rather than using concatenation for constructing or computing the cost volumes, one or more of the models may use cross-correlation (e.g., sliding dot product). In addition, one or more of the models (e.g., the no bottleneck model) may use flat convolutional layers rather than a bottleneck (e.g., encoder/decoder framework) for the matching layers 108, or may user smaller bottleneck layers (e.g., in the small/tiny model). Further, such as in the single tower model, one of the two streams or towers 118 may be removed, and both of the images 102 may be input into a single stream. In other examples, a smaller number of weights or filters may be used than in the ML argmax model, such as in the small/tiny model. For example, the small model may use less filters and/or weights than the ML argmax model (e.g., in the matching layers 108), and the tiny model may uses even less filters (e.g., half as many 3D filters as in the small model) and/or weights.

The DNN 100 may include one or more feature extraction layers 104A and 104B. The feature extraction layers 104A may compute a first feature map corresponding to the first image 102A and the feature extraction layers 104B may compute a second feature map corresponding to the second image 102B. The feature maps output by the feature extraction layers 104A and 104B may be used by the cost volume layers 106A and 106B to compute the cost volumes, as described in more detail herein.

In some examples, a first layer of the feature extraction layers 104A and 104B may include a down-sampling layer. The down-sampling layer may be used reduce the size of the input to the feature extraction layers 104A and 104B. In some non-limiting examples, the size may be reduced by a factor of two in each direction (e.g., height and width). Down-sampling may be executed to reduce both the computation and memory use in the cost volume layers 106A and 106B (e.g., because the output of the feature extraction layers 104A and 104B may be used to compute or generate the cost volumes). The feature extraction layers 104A and 104B may further include—after the down-sampling layer(s)—a number of superblocks (e.g., 8), each including two or more convolutional layers that accept residual connections. In addition, after the superblocks, the feature extraction layers 104A and 104B may include another convolutional layer. The output of the feature extraction layers 104A and 104B may include feature map tensors having dimensions of $½H×½ W×F$, where F is the number of features (e.g., without limitation, F may be equal to 32).

The feature extraction layers 104A and 104B may share weights between corresponding layers. For example, a second layer of the feature extraction layers 104A may share weights and/or learn the weights (e.g., during training of the DNN 100) with a second layer of the feature extraction layers 104B.

The DNN 100 may include one or more cost volume layers 106A and 106B. The cost volume layers 106A and 106B may represent or be a result of concatenating the first feature map with the second feature map. For example, the cost volume layers 106A may correspond to or represent a first cost volume corresponding to the first image 102A and the cost volume layers 106B may correspond to or represent a second cost volume corresponding to the second image 102B. For example, to generate the first cost volume, the left feature map may be matched against the right feature map by sliding the right feature map tensor (e.g., corresponding to the right feature map) to the left along the epipolar lines of the left feature map tensor (e.g., corresponding to the left feature map). In some examples, the sliding of the right feature map tensor to the left along the epipolar lines of the left feature map tensor may be after padding the left feature map tensor by the max disparity. The max disparity may be a hyper-parameter of the DNN 100, and may be, in some non-limiting examples, 96. At corresponding pixel positions between the left feature map tensor and the right feature map tensor, the left feature map and the right feature map may be concatenated and copied into a resulting four-dimensional (4D) cost volume (e.g., the first cost volume). In some examples, the 4D cost volume may have dimensions of $½D×½H×½ W×2F$, where D is the max disparity (e.g., where the spatial dimension of the input images 102 and the max disparity are down-sampled to half size). However, this is not intended to be limiting, and in some examples, the dimensions may be down-sampled to two-thirds, a quarter, an eighth, and/or by another amount, without departing from the scope of the present disclosure.

Similarly, for example, to generate the second cost volume, the right feature map may be matched against the left feature map by sliding the left feature map tensor to the right along the epipolar lines of the right feature map tensor. In some examples, the sliding of the left feature map tensor to the right along the epipolar lines of the right feature map tensor may be after padding the right feature map tensor by the max disparity. At corresponding pixel positions between the right feature map tensor and the left feature map tensor, the right feature map and the left feature map may be concatenated and copied into a resulting four-dimensional (4D) cost volume (e.g., the second cost volume). The 4D cost volume may have dimensions of $½D×½H×½ W×2F$, where D is the max disparity (e.g., where the spatial dimension of the input images 102 and the max disparity are down-sampled to half size). However, this is not intended to be limiting, and in some examples, the dimensions may be down-sampled to two-thirds, a quarter, an eighth, and/or by another amount, without departing from the scope of the present disclosure.

The DNN 100 may include one or more matching layers 108A and 108B. The matching layers 108A and 108B may be used to perform stereo matching by comparing features from the cost volumes to determine pixels from the first image 102A that match pixels from the second image 102B. The matching layers 108A and 108B may include an encoder/decoder "bottleneck" framework to allow the DNN 100 to perform matching of features at multiple resolutions (e.g., each layer of the encoder—e.g., a multiscale encoder—may down-sample to a lower resolution for performing matching). The encoder layers of the matching layers 108A and 108B may be followed by decoder layers with skip connections to incorporate information from the various resolutions of the encoder layers.

In some examples, the matching layers 108A and 108B may include 3D convolutional layers followed by deconvolutional layers. In such examples, each of the convolutional layers of the matching layers 108A and 108B may include 3D convolutional layers. However, in some examples, one or more 3D convolutional layers may be followed by one or more 2D convolutional layers. For a non-limiting example, two or three 3D convolutional layers may be used, followed by 2D convolutional layer(s). By using one or more 2D convolutional layers (e.g., where conventional systems may have used all 3D convolutional layers), and thus reducing the number of 3D convolutional layers, less processing may be required without sacrificing accuracy. For example, because one or more 3D convolutional layers may be still be used, the benefits of the 3D convolutional layers may be realized, and using the 2D convolutional layers may serve to reduce the size of the DNN 100 and the compute requirements for the DNN 100.

The use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution after the down-sampling layer of the feature extraction layers 104A and 104B (e.g., to $½H×½ W$), or otherwise used to up-sample to the input spatial resolution of a next layer (e.g., the next matching layer 108A and 108B or the up-sampling layer 110A or 110B.

In addition to, or alternatively from, using deconvolutional layers after the convolutional layers of the matching layers 108A and 108B, one or more up-sampling layers (e.g., nearest neighbor) may be used. In such examples, the up-sampling layer(s) may be followed by one or more convolutional layers. As such, in some examples, the matching layers 108A and 108B may include encoder layers (e.g., one or more 3D convolutional layers and/or one or more 2D convolutional layers) followed by decoder layers that are either deconvolutional layers or a combination of up-sampling and convolutional layers.

In some examples, the matching layers 108A and 108B may include four down-sampling layers, followed by two convolutional layers, followed by four up-sampling layers that accept residual connections. In some examples, the matching layers 108A and 108B may share weights between corresponding layers. For example, a first layer of the matching layers 108A may share weights and/or learn the weights (e.g., during training of the DNN 100) with a first layer of the matching layers 108B.

After the last decoder layer (e.g., deconvolutional layer) of the matching layers 108A and 108B, there may be one or more up-sampling layers 110A and 110B. The up-sampling layer(s) may be used to produce a left tensor corresponding to the left image (e.g., the first image 102A) and a right tensor corresponding to the right image (e.g., the second image 102B) having dimensions D×H×W×1. The left tensor and the right tensor may be representative of matching costs between pixels of the first image 102A and pixels of the second image 102B. In some examples, without limitation, the DNN 100 may include only one up-sampling layer 110A and 110B.

The DNN 100 may further include one or more aggregator layers 112A and 112B. In some examples, the aggregator may be a soft argmax function that may use the costs from the output of the up-sampling layer(s) 110 (e.g., after conversion to probabilities) to determine the best or most likely disparity for each pixel of each of the first image 102A and the second image 102B. However, soft argmax has the drawback of assuming that all context has already been taken into account, which is not always the case. As a result, in some examples, the DNN 100 may include the machine learned (ML) argmax function. The ML argmax function may normalize the probability volume (e.g., where the probabilities are the costs after conversion) across the disparity dimension, D. The ML argmax function may include one or more convolutional layers (e.g., the ML argmax layers 112A and 112B) that may produce a single value for each pixel. By using one or more convolutional layers to implement the ML argmax layers function, the ML argmax layers 112A and 112B may be trained to learn the context— something that was not possible with soft argmax function. As such, the ML argmax layer(s) 112A and 112B may include trainable parameters (e.g., weights and biases) that may be trained using backpropagation during training of the DNN 100 (e.g., the ML argmax function may be referred to as a parametrized version of the soft argmax function).

In some examples, the ML argmax layers 112A and 112B may include only (2D and/or 3D) convolutional layers. In other examples, the ML argmax layers 112A and 112B may include an encoder/decoder framework including convolutional layers followed by deconvolutional layers. By including an encoder/decoder (e.g., bottleneck) framework, the DNN 100 may require less compute requirements, and may increase training times for the DNN 100. The ML argmax layers 112A and 112B may include five layers in some non-limiting examples, where the layers may be (2D and/or 3D) convolutional layers, deconvolutional layers, or a combination thereof.

The DNN 100 may apply a sigmoid activation function 114A and 114B at the output of the ML argmax layers 112A and 112B. The sigmoid activation function 114A and 114B may convert the value for each pixel output by the ML argmax layers 112A and 112B to a disparity estimate for the pixel. When the sigmoid activation functions 114A and 114B are not used, the disparity value estimates may be less accurate.

As a result of the combination of the ML argmax layers 112A and 112B and the sigmoid activation functions 114A and 114B, the disparity values extracted are more accurate. In addition, the DNN 100, and specifically the ML argmax layers 112A and 112B, are better at handling uniform or multi-modal probability distributions than soft argmax. The ML argmax function (implemented using the ML argmax layers 112A and 112B) may also yield more stable convergence during training of the DNN 100.

In some example, the DNN 100 may include rectified linear unit (ReLU) activation functions (e.g., applied to or represented by one or more layers of the DNN 100). The ReLU activation function may apply an elementwise activation function, such as the max (0, x), thresholding at zero, for example. The resulting volume of a ReLU layer may be the same as the volume of the input of the ReLU layer. When using a ReLU activation function, however, batch normalization layers may need to be included (e.g., on outputs of convolutional layers prior to being input to the ReLU activation function), thereby increasing the overall size of the DNN 100.

In some examples, in order to reduce the size and thus the run-time for the DNN 100, and further to reduce processing requirements for executing the DNN 100, ReLU activation functions and batch normalization layers may not be used. In such examples, exponential linear unit (ELU) activation functions may be used. ELU activation functions may include negative values which may allow the ELU activation function to push mean unit activations closer to zero. By pushing the mean unit activations closer to zero, learning rates may be increased (comparatively to ReLU with batch normalization) because the gradient is brought closer to unit natural gradient. ReLU activation functions (by not including negative values) rely on batch normalization layers to push the mean towards zero, while ELU activation functions are able to accomplish this without batch normalization layers and thus with a smaller computational footprint. As such, in some examples, ELU activation functions may be used, and ReLU activation functions and batch normalization layers may not.

In some examples, such as described herein, layers of the DNN 100 may include parameters (e.g., weights and/or biases), while others may not, such as the ELU layers, for example. The parameters may be learned by the DNN 100 during training. Further, some of the layers of the DNN may include additional hyper-parameters (e.g., learning rate, stride, epochs, kernel size, number of filters, max disparity, etc.)—such as the convolutional layer(s) and the deconvolutional layer(s)—while other layers may not, such as the ReLU or ELU layer(s). Although ReLU, ELU, and sigmoid activation functions are described herein, various activation functions may be used, including but not limited to, leaky ReLU, parametric ReLU, linear, hyperbolic tangent (tan h), etc. The parameters, hyper-parameters, and/or activation functions are not to be limited and may differ depending on the embodiment.

In some examples, the DNN 100 may be trained for 75,000, 85,000, 90,000 or more iterations (e.g., between approximately 2 and 3 epochs), with a batch size of 1. In addition, an optimizer may be used in some examples, such as an Adam optimizer. In other examples, gradient descent or stochastic gradient descent may be used. The learning rate may be, in some examples, $10^{-4}$, which may be reduced over time.

The disparity values predicted by the DNN 100 may be used to determine depth of the features in the physical environment represented by the pixels of the images 102. For example, using equation (1), above, the disparity values may be used to calculate a distance, or depth, of the objects in the physical environment from the vehicle 500 (or other object, such as a drone, robot, etc.). In addition, the calibration of the cameras (or other sensors of the vehicle 500) may include correlations between pixel positions and x, y coordinates in the physical environment. As such, by also understanding depth, accurate 3D coordinates of objects in the physical environment may be determined (e.g., an x, y, and z location). The location of the objects may be used by the vehicle 500 (e.g., one or more components of the autonomous driving software stack) or another object to aid in navigating or otherwise understanding the physical environment.

Now referring to FIG. 1C, FIG. 1C is a table 134 comparing accuracy of different architectures for machine learning models, in accordance with some embodiments of the present disclosure. For example, the table 134 may include D1-all error measures corresponding to the models in the model column 122 of the table 120. The data in the table 134 was generated using the models and the associated architectures as illustrated in the table 120. The training data used for generating the data was a combination of LIDAR data in supervised training and photometric consistency in unsupervised training. The use of this semi-supervised combination is described in more detail herein when comparing supervised, unsupervised, and unsupervised training methods. More specifically, the training data was 200 KITTI 2015 augmented training images and 29,000 KITTI images with sparse ground truth data. The network size in size column 138 may correspond to the number of weights used (e.g., 3.1 M represents 3.1 million weights).

As a result of the testing, the ML argmax model performed the best (e.g., had the least D1-all error) as compared to the other models, as indicated by the table 134. In addition, reducing the size of the network by either using a smaller network, using cross-correlation, or by removing one of the towers entirely only had a slight effect on the error, despite the fact that a single tower requires 1.8 times less memory, using cross-correlation requires 64× less memory, the small network contains 36% fewer weights, and the tiny network contain 82% fewer weights. This data from table 134 is thus an indication of the importance and effectiveness of using the encoder/decoder bottleneck framework in the matching layers 108A and 108B of the DNN 100 to extract information from the cost volumes. The data further indicates that concatenation, as compared to cross-correlation, is more accurate.

In some examples, the DNN 100 may be implemented on an embedded graphics processing unit (GPU). By using an embedded GPU, programmatic optimization may be more achievable. In addition, the DNN 100 may be more capable of real-time (e.g., 20 frames per second) deployment when using an embedded GPU, especially where 3D convolutional layers and/or 2D convolutional layers are used. For example, with reference to FIG. 1D, computation times (in milliseconds) for different stereo DNN models (e.g., as indicated in model column 144 of table 142) on various GPU architectures (e.g., NVIDIA Titan XP 148, NVIDIA GTX 1060 150, and an embedded NVIDIA Jetson TX2 152). Resolution column 146 indicates the image dimensions and the max disparity (e.g., H×W×D). The columns labeled "TF" indicate TensorFlow runtime and the columns labeled "opt" indicate custom runtime based on TensorRT/cuDNN. The custom runtime may include a set of custom plugins for TensorRT that may implement the 3D convolutions/deconvolutions (e.g., of the matching layers 108A and 108B of the DNN 100), the cost volume creation, soft argmax, and ELU activation functions. The single "OOM" indicates an "out of memory" exception. For the embedded Jetson TX2 152, only the custom runtime, opt, was used because TensorFlow is not compatible. As indicated by the table 142, by using a custom runtime with Titan XP, near real-time performance (e.g., 20 fps) was achieved, while efficient performance was achieved on the embedded Jetson TX2 152.

Figure 2:
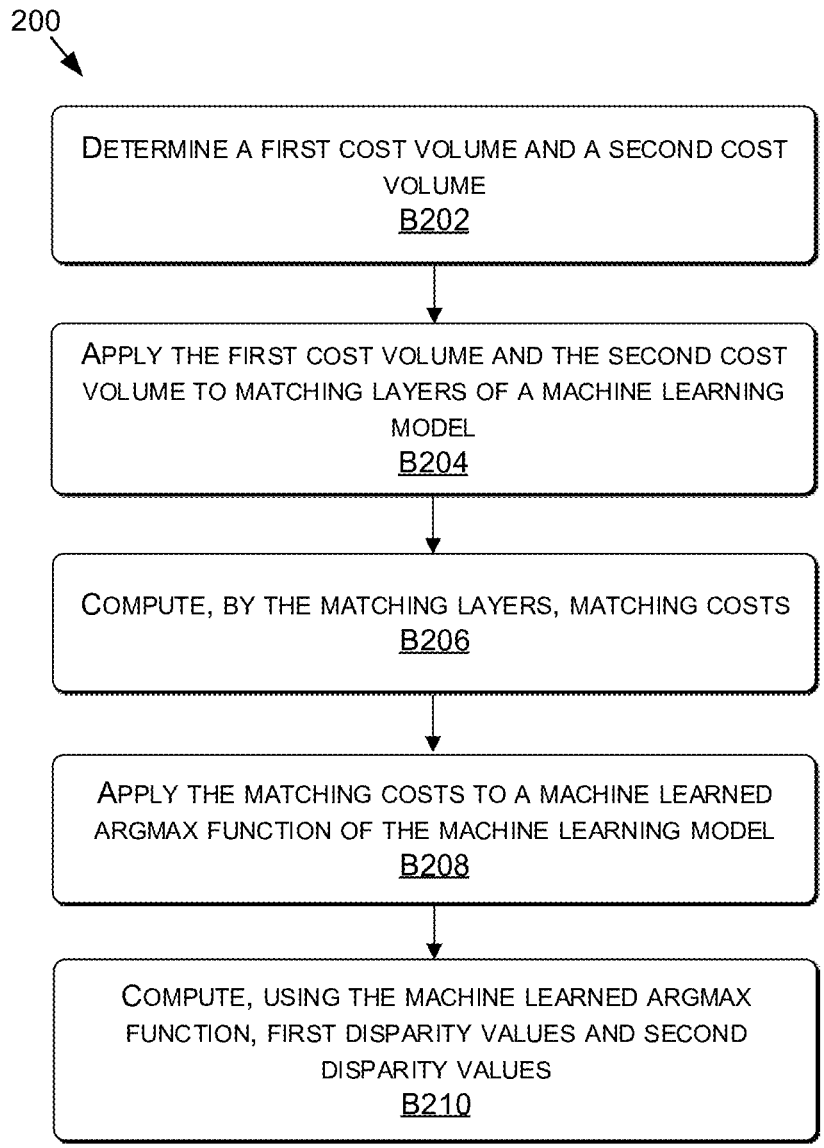
FIG. 2 is a flow diagram illustrating an example method for predicting depth from stereoscopic images using a machine learning model, in accordance with some embodiments of the present disclosure.

Now referring to FIG. 2, each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the DNN 100 of FIG. 1. However, this method may additionally or alternatively be executed by any one system, or any combination of systems, including, but not limited to, those described herein.

FIG. 2 is a flow diagram illustrating an example method 200 for predicting depth from stereoscopic images using a machine learning model, in accordance with some embodiments of the present disclosure. The method 200, at block B202, includes determining a first cost volume and a second volume. For example, a first cost volume (represented by the cost volume layer(s) 106A) and the second cost volume (represented by the cost volume layer(s) 106B) may be determined. The determination may include concatenating the left feature map tensor with the right feature map tensor to generate the first cost volume and the concatenating the right feature map tensor with the left feature map tensor to generate the second cost volume. The left feature map may be computed based on image data representing the first image 102A and the right feature map may be computed based on image data representing the second image 102B. As such, the determination of the first cost volume and the second volume may be based at least in part on one or more comparisons between image data representative of the first image 102A of a first field of view of a first sensor (e.g., a first or left image sensor of a stereo camera) and image data representative of a second image 102B of a second field of view of a second sensor (e.g., a second or right image sensor of the stereo camera).

The method 200, at block B204, includes applying the first cost volume and the second cost volume to matching layers of a machine learning model. For example, the first cost volume may be applied to the matching layers 108A and the second volume may be applied to the matching layers 108B of the DNN 100.

The method 200, at block B206, includes computing, by the matching layers, matching costs. For example, the matching layers 108A and 108B may compute matching costs between features of the images 102.

The method 200, at block B208, includes applying the matching costs to a machine learned argmax function of the machine learning model. For example—and after converting the costs to probabilities in some examples—the matching costs (or probabilities) may be applied to the ML argmax layers 112A and 112B of the DNN 100.

The method 200, at block B210, includes computing, using the machine learned argmax function, first disparity values and second disparity values. For example, the ML argmax layers 112A may compute first disparity values corresponding to the first image 102A and the ML argmax layers 112B may compute second disparity values corresponding to the second image 102B. In some examples, the first disparity values and the second disparity values may be applied to sigmoid activation functions 114A and 114B to generate final disparity value predictions.

Training the Stereoscopic Deep Neural Network

As described herein, conventional stereo DNNs have used either LIDAR data alone (supervised training) or photometric consistency alone (unsupervised training) to train the stereo DNNs. However, both LIDAR data and photometric consistency have drawbacks. For example, as described herein with respect to conventional DNN training, using LIDAR data often results in noisy outputs (e.g., due to sparsity in data) that have reduced sharpness along edges of objects, and that suffer at greater distances. In addition, LIDAR data has a limited field of view (e.g., 2 degrees upward and 35 degrees downward). LIDAR sensor may also produce lines that are represented in the LIDAR data, and that require filtering and/or post-processing to remove. However, by filtering and/or post-processing, the LIDAR data is even sparser and thus results in increased noise. Photometric consistency may also include drawbacks, such as noise in the output as a result of inaccuracy of camera calibration, movement of the camera during image capture, etc. In addition, by being completely unsupervised, the accuracy of the ground truth may suffer, whereas with supervised training the accuracy of the ground truth may be validated.

As a result of the drawbacks of conventional training methods for stereo DNNs, the stereo DNNs of the present disclosure may use both LIDAR data (supervised training mode) and photometric consistency (unsupervised training mode) during training in a semi-supervised mode or manner By using both photometric consistency and LIDAR data, the benefits of each may be learned by a DNN while the drawbacks to each may be mitigated by the other. For example, by using photometric error in addition to LIDAR data, accuracy at greater distances may be increased and the sharpness along edges of objects may be increased. In particular, using photometric error may decrease the noise of LIDAR data only training by increasing the amount of data that can be used for predicting depth as compared to the sparse data from LIDAR alone. In addition, by including photometric consistency, the field of view of the training data may be increased as compared to LIDAR data alone, thus resulting in depth determinations by the DNN for a larger portion of the physical environment.

Figures 3A, 3B:
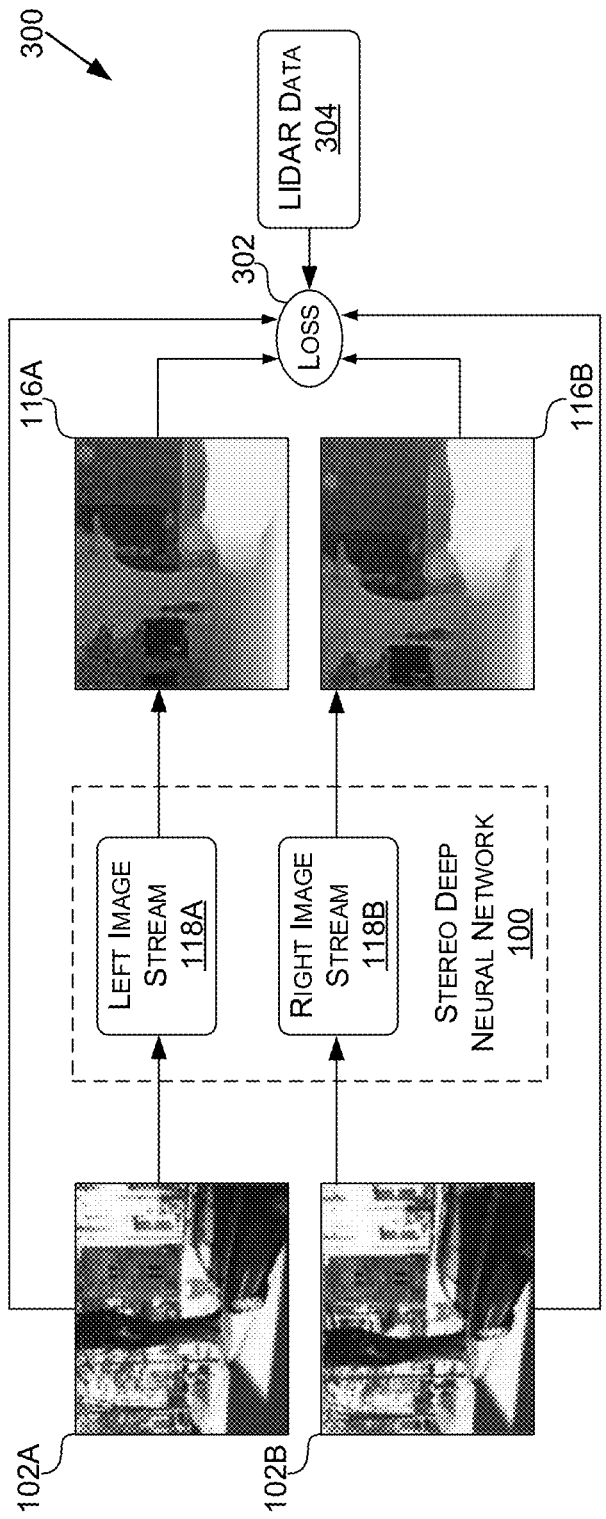
FIG. 3A is a data flow diagram illustrating a process for training a machine learning model for depth estimation using stereoscopic images, in accordance with some embodiments of the present disclosure.
FIG. 3B is a table comparing accuracy of different training methods for machine learning models, in accordance with some embodiments of the present disclosure.

Now referring to FIG. 3A, FIG. 3A is a data flow diagram illustrating a process 300 for training a machine learning model for depth estimation using stereoscopic images, in accordance with some embodiments of the present disclosure. The process 300 may include using training images (e.g., the first image(s) 102A and the second image(s) 102B) to train the DNN 100 to generate accurate and acceptable results (e.g., predicted disparity values). The DNN 100 may be capable of being trained using LIDAR data in a supervised manner, photometric consistency in an unsupervised manner, or a combination thereof.

As described herein, the training data may include LIDAR data 304 for supervised training, where depth values from the LIDAR data 304 are used as ground truth values for comparison to the disparity values from the output of the DNN 100. For example, the depth data from the LIDAR data 304 may be projected into the first image 102A and/or the second image 102B, and then disparity values may be assigned to the pixels of the first image 102A and/or the second image 102B using the LIDAR data 304. The LIDAR data 304 may be generated by one or more LIDAR sensors of vehicles, or other objects, captured in a real-world physical environment and/or may include simulated or virtual data from virtual LIDAR sensors of a virtual vehicle, or other object, in a virtual simulation.

The training data may further include using photometric consistency by warping the images 102 based on the predicted disparity values (e.g., from the disparity maps 116). For example, a structure similarity metric, $S_{sim}$, may be determined based on a comparison of the first image 102A and the second image 102B using one of the first disparity map 116A or the second disparity map 116B. As an example using the first image 102A, the pixels of the first image 102A may be warped to coincide with the second camera (e.g., the camera or image sensor that captured the second image 102B) with the values from the first disparity map 116A. As such, the first image 102A may be converted to the pixels or image plane of the second camera, shifted by the disparity, and then a comparison may be calculated as $S_{sim}$ between the pixels of the warped and shifted first image 102A and the second image 102B. The same process may be used for the second image 102B with respect to the first camera, where the second image 102B may be converted to the pixels or image plane of the first camera, shifted by the disparity (e.g., from the second disparity map 116B), and then a comparison may be calculated as $S_{sim}$ between the pixels of the warped and shifted second image 102B and the first image 102A. In any example, a larger value of $S_{sim}$ may indicate a greater error. Back propagation may be used during training to update the parameters of the DNN 100 until the values of $S_{sim}$ are less, or within an acceptable accuracy range.

In some examples, the DNN 100 may be trained using multiple iterations until the value of a loss function(s) 302 of the DNN 100 is below a threshold loss value. For example, the DNN 100 may perform forward pass computations on the images 102. In some examples, the DNN 100 may extract features of interest from the images 102 and predict disparity values (e.g., as represented by the disparity maps 116A and 116B) on a pixel-by-pixel basis. The loss function(s) 302 may be used to measure error in the predictions of the DNN 100 using ground truth data, as described in more detail herein.

The loss function 302, in some examples, may include an L1 loss function. However, this is not intended to be limiting and other loss functions may be used without departing form the scope of the present disclosure (e.g., cross entropy, L2 loss, etc.) Backward pass computations may be performed to recursively compute gradients of the loss function 302 with respect to training parameters. In some examples, weights and biases of the DNN 100 may be used to compute these gradients.

In one non-limiting example, the loss function 302 may combine the supervised term along with an unsupervised term, as represented in equation (2), below:

$$L = \lambda_1 E_{image} + \lambda_2 E_{LIDAR} + \lambda_3 E_{lr} + \lambda_4 E_{ds} \text{ where} \qquad (2)$$

$$E_{image} = E_{image}^l + E_{image}^t \qquad (3)$$

$$E_{LIDAR} = |d_l - \bar{d}_l| + |d_r - \bar{d}_r| \qquad (4)$$

-continued $$E_{lr} = \frac{1}{n}\sum_{ij}|d_{ij}^l - \tilde{d}_{ij}^l| + \frac{1}{n}\sum_{ij}|d_{ij}^r - \tilde{d}_{ij}^r| \quad (5)$$

$$E_{ds} = E_{ds}^l + E_{ds}^r \quad (6)$$

where equation (2) may ensure photometric consistency, equation (3) may compare estimated disparities to sparse LIDA data, equation (4) may ensure that the first disparity map 116A and the second disparity map 116B are consistent with each other, and equation (5) may encourage the disparity maps 116 to be piecewise smooth. In addition, $E^l_{image}$, $E^l_{ds}$, $E^r_{image}$, and $E^r_{ds}$ may be represented according to equations (7)-(10), below:

$$E^l_{image} = \frac{1}{n}\sum_{i,j}\alpha\frac{1 - S_{sim}(I_{ij}^l, \tilde{I}_{ij}^l)}{2} + (1-\alpha)|I_{ij}^l - \tilde{I}_{ij}^l| \quad (7)$$

$$E^l_{ds} = \frac{1}{n}\sum_{i,j}|\partial_x d_{ij}^l|e^{-\|\partial_x I_{i,j}^l\|} + |\partial_y d_{ij}^l|e^{-\|\partial_y I_{i,j}^l\|} \quad (8)$$

$$E^r_{image} = \frac{1}{n}\sum_{i,j}\alpha\frac{1 - S_{sim}(I_{ij}^r, \tilde{I}_{ij}^r)}{2} + (1-\alpha)|I_{ij}^r - \tilde{I}_{ij}^r| \quad (9)$$

$$E^r_{ds} = \frac{1}{n}\sum_{i,j}|\partial_x d_{ij}^r|e^{-\|\partial_x I_{i,j}^r\|} + |\partial_y d_{ij}^r|e^{-\|\partial_y I_{i,j}^r\|} \text{ where} \quad (10)$$

$$\tilde{I}^l = w_{rl}(I_r, d_l) \quad (11)$$

$$\tilde{I}^r = w_{lr}(I_l, d_r) \quad (12)$$

$$\tilde{d}^l = w_{rl}(d_r, d_l) \quad (13)$$

$$\tilde{d}^r = w_{lr}(d_l, d_r) \quad (14)$$

$$w_{lr}(I, d) = (x, y) \mapsto I(x - d(x, y), y) \quad (15)$$

$$w_{rl}(I, d) = (x, y) \mapsto I(x + d(x, y), y) \quad (16)$$

$$S_{sim}(x, y) = \left(\frac{2\mu_x\mu_y + c_1}{\mu_x^2 + \mu_y^2 + c_1}\right)\left(\frac{2\sigma_{xy} + c_2}{\sigma_x^2 + \sigma_y^2 + c_2}\right) \quad (17)$$

where $I_l$ is the first image 102A and $I_r$ is the second image 102B, dr is the first disparity map 116A and $d_r$ is the second disparity map 116B, $\bar{d}_l$ and $\bar{d}_r$ are the ground truth disparity maps corresponding to the first disparity map 116A and the second disparity map 116B, respectively, $S_{sim}$ is the structural similarity index, n is the number of pixels, and $c_1$ and $c_2$ are constants to avoid dividing by zero. In some examples, $c_1=10^{-4}$ and $c_2=10^{-3}$. In some examples, such as in equations (15) and (16), the coordinates may be non-integers, in which case bilinear interpolation may be used.

In some examples, an optimizer may be used to make adjustments to the training parameters (e.g., weights, biases, etc.), as described herein. In one non-limiting example, an Adam optimizer may be used, while in other examples, stochastic gradient descent, stochastic gradient descent with a momentum term, and/or another optimizer may be used. The training process may be reiterated until the trained parameters converge to optimum, desired, and/or acceptable values.

In some examples, a trained or deployed stereoscopic DNN, such as the DNN 100, may be used to train a monocular DNN. For example, because monocular DNNs may not be as accurate as stereoscopic DNNs, the outputs of the stereoscopic DNNs may be used as ground truth for training a monocular DNN. For example, a monocular DNN may use a single input image of a field of view of a real-world environment, and stereo images may be captured at the same time of at least a portion of the same field of view. As such, the disparity maps output by the stereoscopic DNNs may be used as ground truth to train the monocular DNN. In such examples, the monocular DNN may learn to more accurately predict more objects, with more context, than a monocular DNN being trained on monocular data alone.

Now referring to FIG. 3B, FIG. 3B is a table 306 comparing accuracy of different training methods for machine learning models, in accordance with some embodiments of the present disclosure. For example, different models (as indicated in the models column 308)—such as conventional monocular models (e.g., monoDepth)—were tested in addition to different variations of the DNN 100. The training data used to compute the results in table 306 may be the same training data used for the table 134 of FIG. 1C, described herein. The table 306 includes D1-all error for each of the models (except for monoDepth due to limitations on types of training data that can be used for monocular networks) using LIDAR data only (e.g., indicated by the LIDAR column 310), photometric consistency only (e.g., indicated by the photometric column 312), and a combination of LIDAR and photometric (e.g., indicated by the LIDAR and photometric column 314). The data indicates that a monocular DNN, such as monoDepth, is much less accurate than using a stereoscopic DNN, such as the DNN 100. In addition, the data indicates that the lowest error, and thus the best accuracy, is accomplished by using LIDAR data and photometric consistency in semi-supervised training, as described herein. As such, the table 306 provides testing validation of the benefits of stereo DNNs over monocular DNNs, as well as the improvements in accuracy from using semi-supervised training as opposed to supervised or unsupervised only.

Figure 3C:
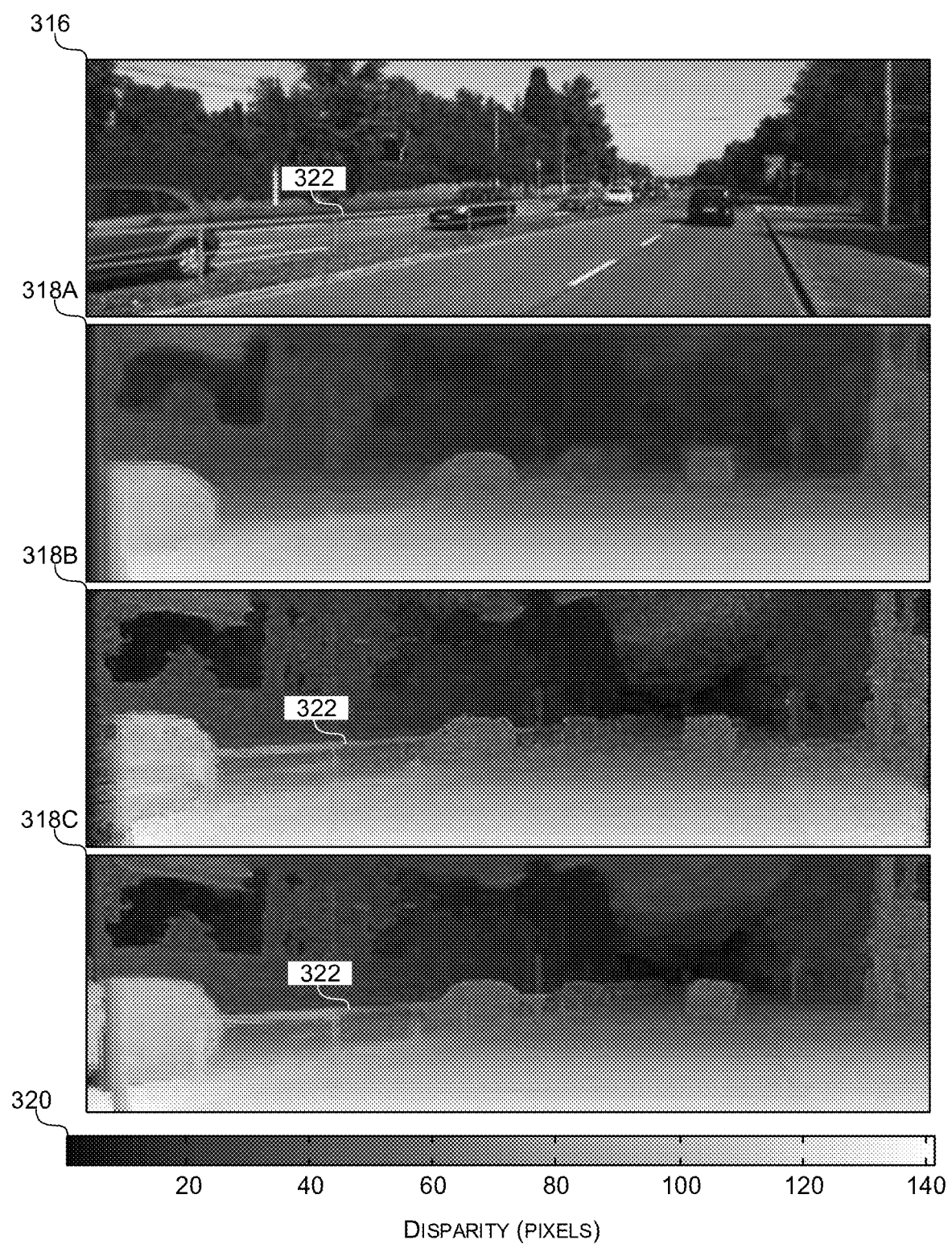
FIG. 3C includes an illustration of example disparity maps based on outputs machine learning models, in accordance with some embodiments of the present disclosure.

Now referring to FIG. 3C, FIG. 3C includes an illustration of example disparity maps 318 based on outputs machine learning models, in accordance with some embodiments of the present disclosure. For example, FIG. 3C highlights advantages of using semi-supervised training (e.g., LIDAR data and photometric consistency) as compared to supervised or unsupervised approaches. FIG. 5C may include an image 316 of a divided highway including a guardrail 322, multiple vehicles, trees, the sky, and other features in the environment. Disparity map 318A is a grayscale conversion of a disparity map generated by a stereo DNN trained using LIDAR data only (e.g., supervised training), disparity map 318B is a grayscale conversion of a disparity map generated by a stereo DNN trained using photometric consistency only (e.g., unsupervised training), and disparity map 318C is a grayscale conversion of a disparity map generated by a stereo DNN trained using LIDAR data and photometric consistency together (e.g., semi-supervised training) The disparity map 318A does not include the guardrail 322. This may be a result of the sparsity of LIDAR data, in addition to other drawbacks of using LIDAR data—such as the need for post-processing and filtering. The disparity map 318B includes the guardrail 322, but is noisier and loses some smoothness along the edges of the vehicles. The noise in the disparity map 318B may result in sharper or harsher contrast between adjacent pixels of similar depth where there shouldn't be, thereby reducing the accuracy of the disparity map 318B. The disparity map 318C includes the guardrail 322, and includes less noise while maintaining the smoothness along the vehicle and other features of the environment. Disparity scale 320 represents the disparity values that correspond to the colors or gradients of the image 316.

Although the described differences with respect to FIG. 3C may be difficult to see in the grayscale conversions of the disparity maps 318, FIG. 5 of U.S. Provisional Application No. 62/646,148, filed on Mar. 21, 2018, which is hereby incorporated by reference in its entirety, includes a more accurate representation in full-color.

Figure 4:
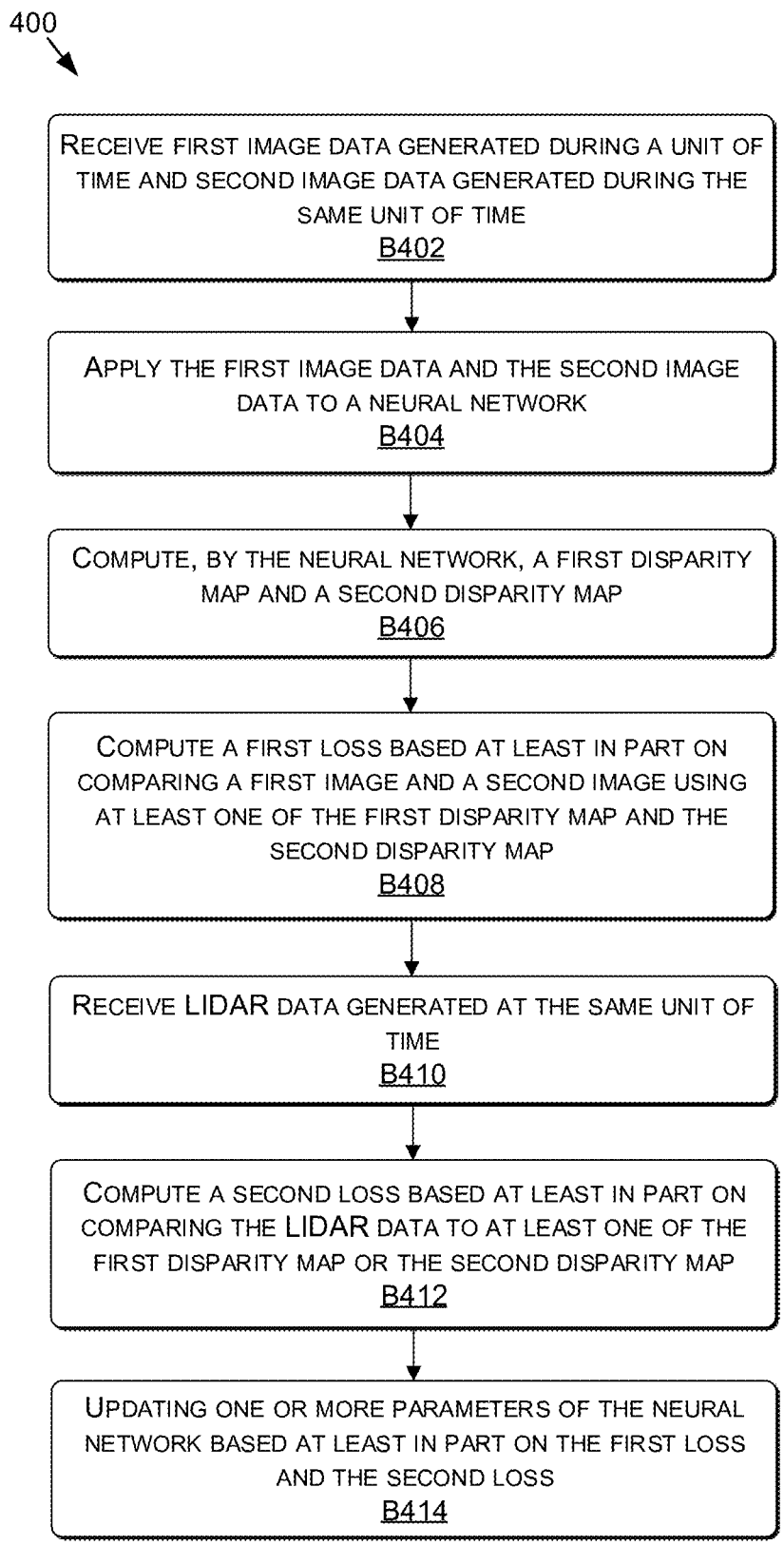
FIG. 4 is a flow diagram illustrating an example method for training a machine learning model to predict depth from stereoscopic images, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the process 300 of FIG. 3A. However, the method may additionally or alternatively be executed by any one system, or any combination of systems, including, but not limited to, those described herein.

FIG. 4 is a flow diagram illustrating an example method 400 for training a machine learning model to predict depth from stereoscopic images, in accordance with some embodiments of the present disclosure. The method 400, at block B402, includes receiving first image data generated during a unit of time and second image data generated during the same unit of time. For example, a stereo camera may capture the first image 102A and the second image 102B at a same time, and the first image 102A and the second image 102B may be received for use in training the DNN 100.

The method 400, at block B404, includes applying the first image data and the second image data to a neural network. For example, first image data representative of the first image 102A and second image data representative of the second image 102B may be applied to (or input to) the DNN 100.

The method 400, at block B406, includes computing, by the neural network, a first disparity map and a second disparity map. For example, the DNN 100 may compute the first disparity map 116A and the second disparity map 116B.

The method 400, at block B408, includes computing a first loss based at least in part on the comparing a first image and a second image using at least one of the first disparity map and the second disparity map. For example, the first image 102A may be compared to the second image 102B using the first disparity map 116A, and the second image 102B may be compared to the first image 102A using the second disparity map 116B.

The method 400, at block B410, includes receiving LIDAR data generated at the same unit of time. For example, the LIDAR data 304 may be received that was generated at the same time as the first image 102A and the second image 102B.

The method 400, at block B412, includes computing a second loss based at least in part on comparing the LIDAR data to at least one of the first disparity map or the second disparity map. For example, the LIDAR data 304 may be compared to the first disparity map 116A and/or the second disparity map 116B to compute a second loss.

The method 400, at block B414, includes updating the one or more parameters of the neural network based at least in part on the first loss and the second loss. For example, the parameters of the layers of the DNN 100 may be trained using the loss function 302, where the loss function 302 may be a combination of the LIDAR data loss and the photometric consistency loss.

Example Autonomous Vehicle

Figure 5A:
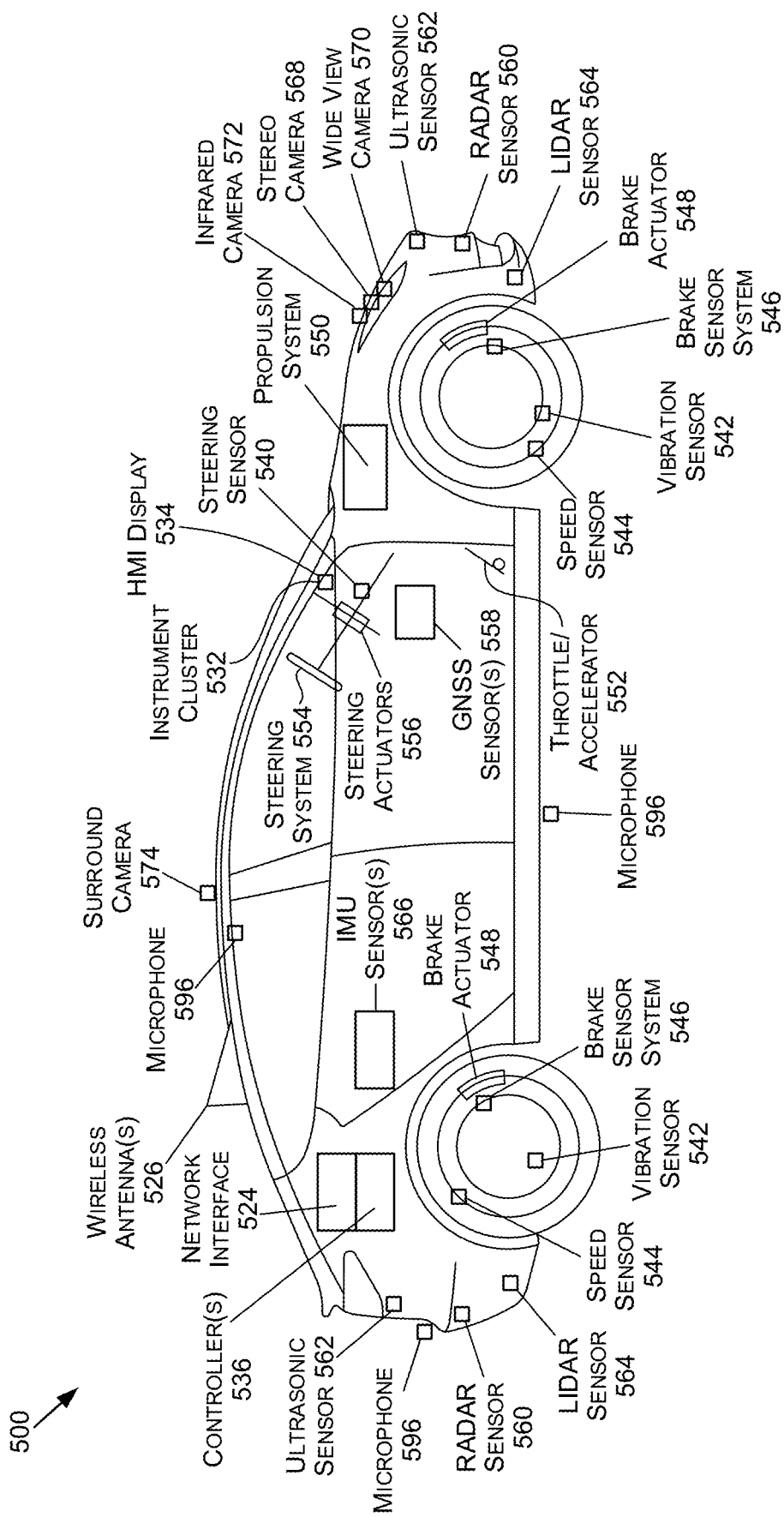
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
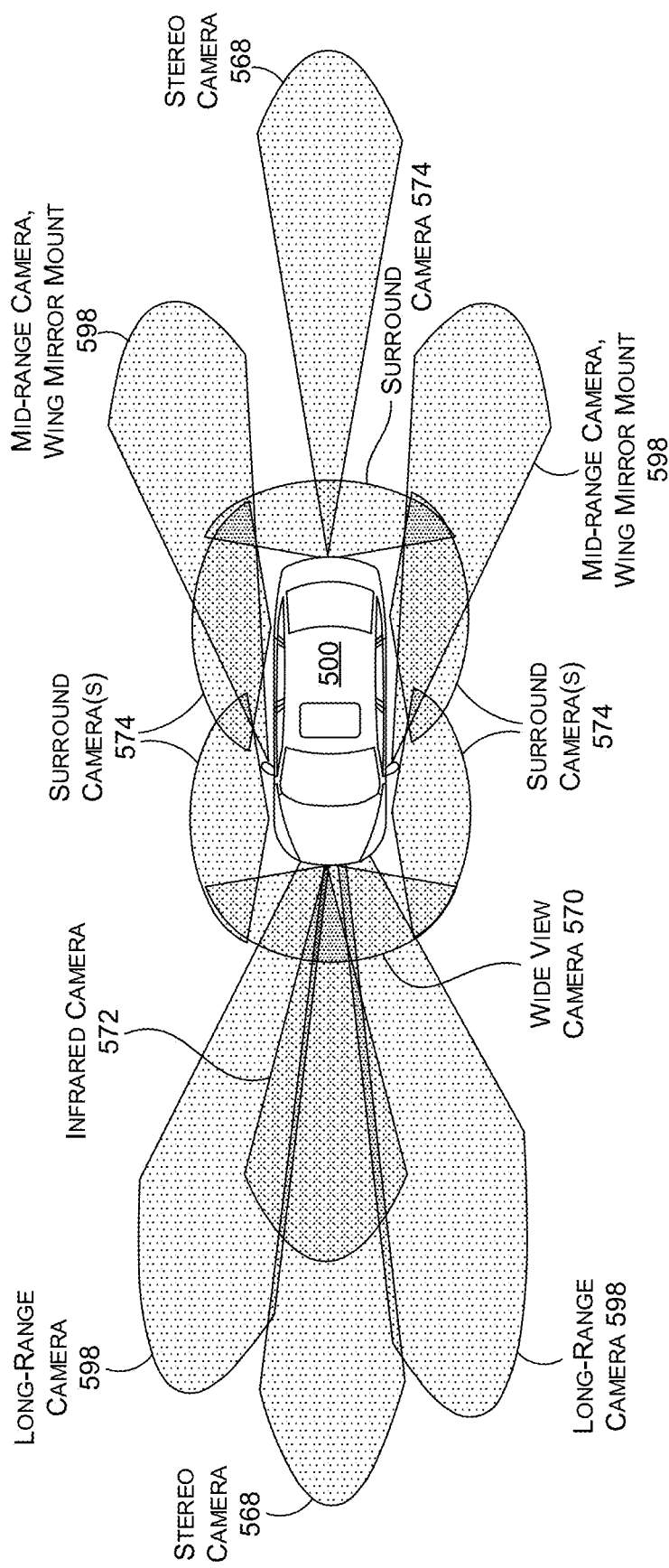
FIG. 5B is an example of camera locations and fields of view for the example autonomous vehicle of FIG. 5A, in accordance with some embodiments of the present disclosure.
Figure 5C:
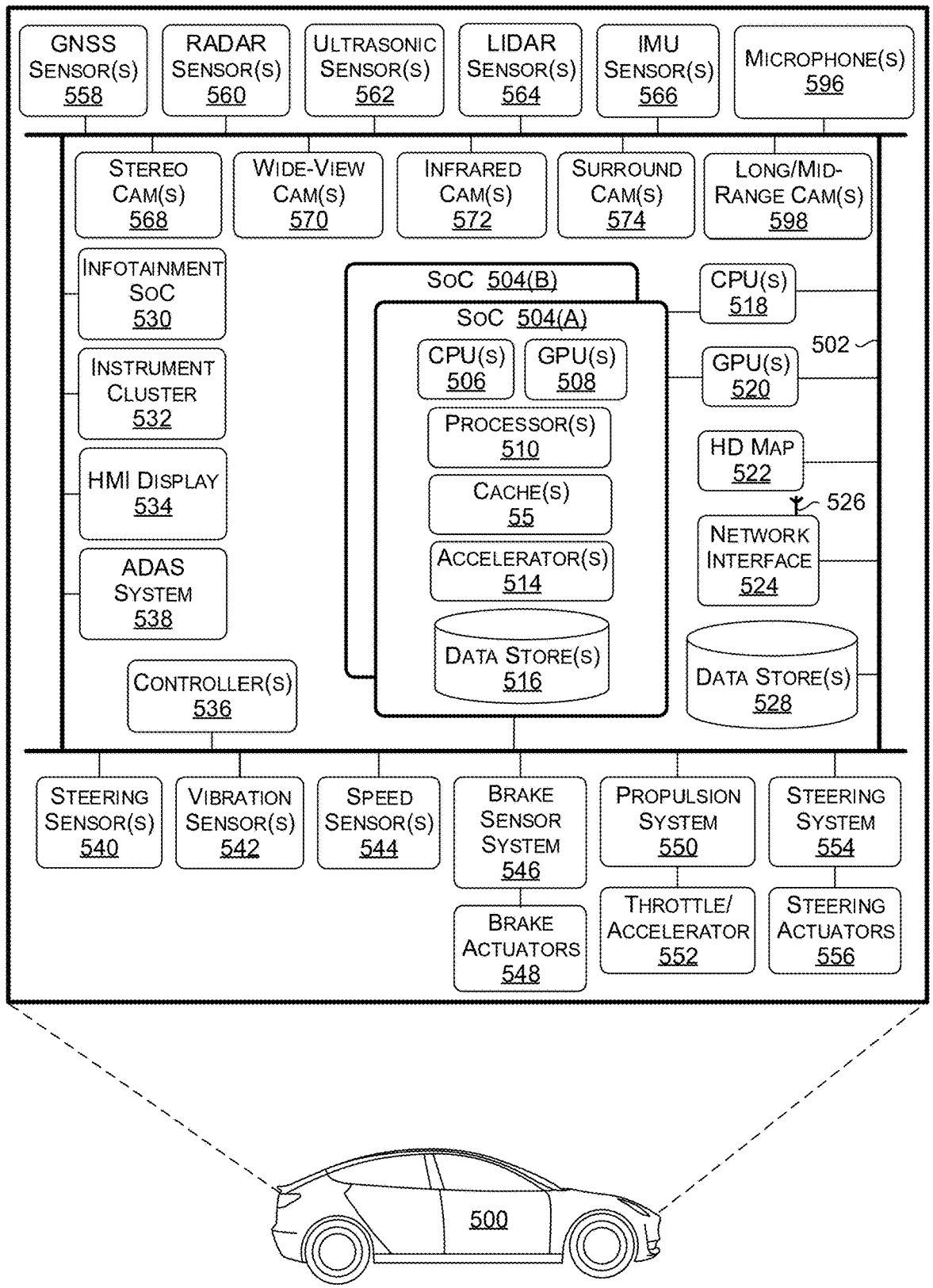
FIG. 5C is a block diagram of an example system architecture for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 520 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 520-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, WiFi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
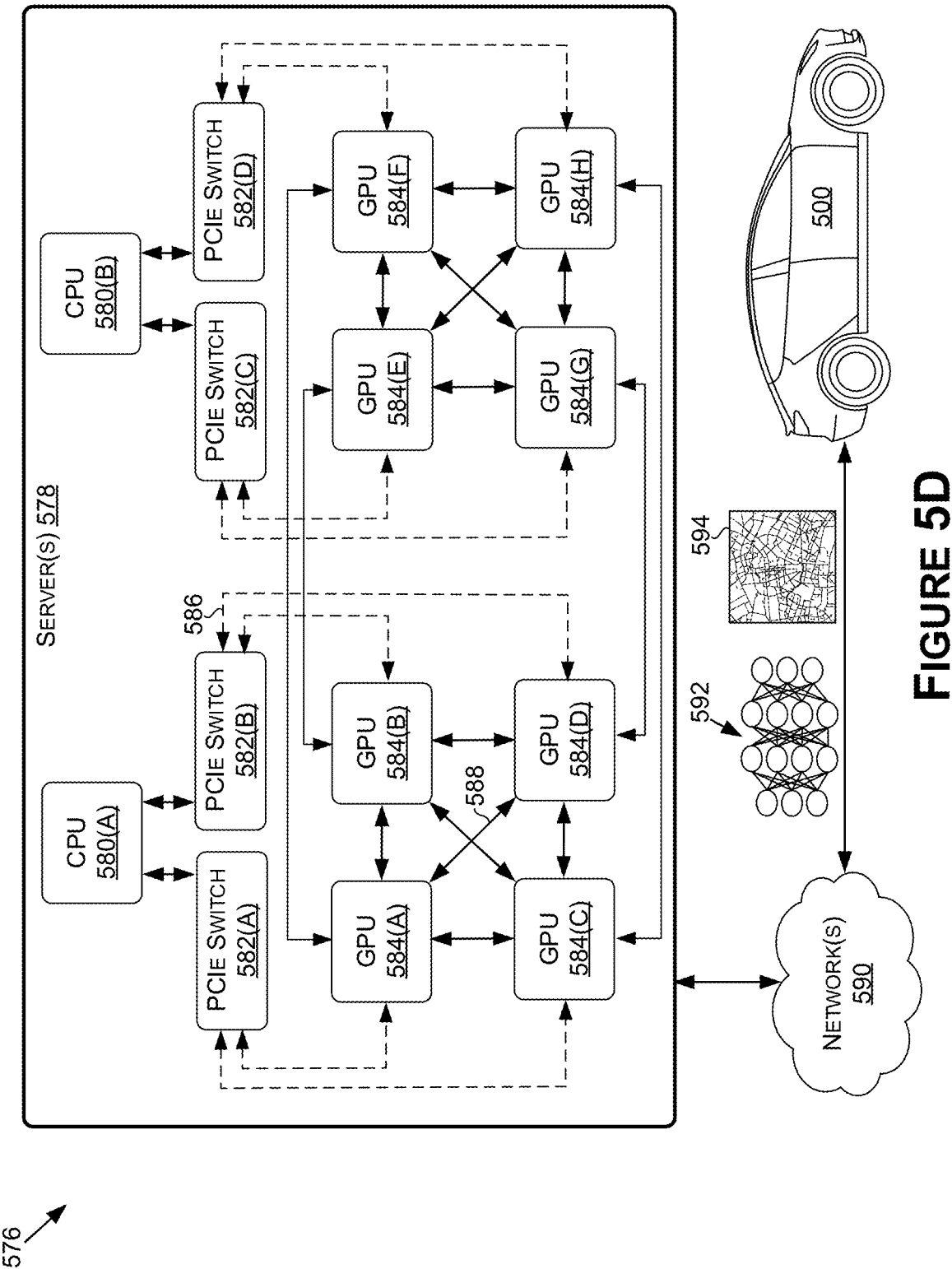
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
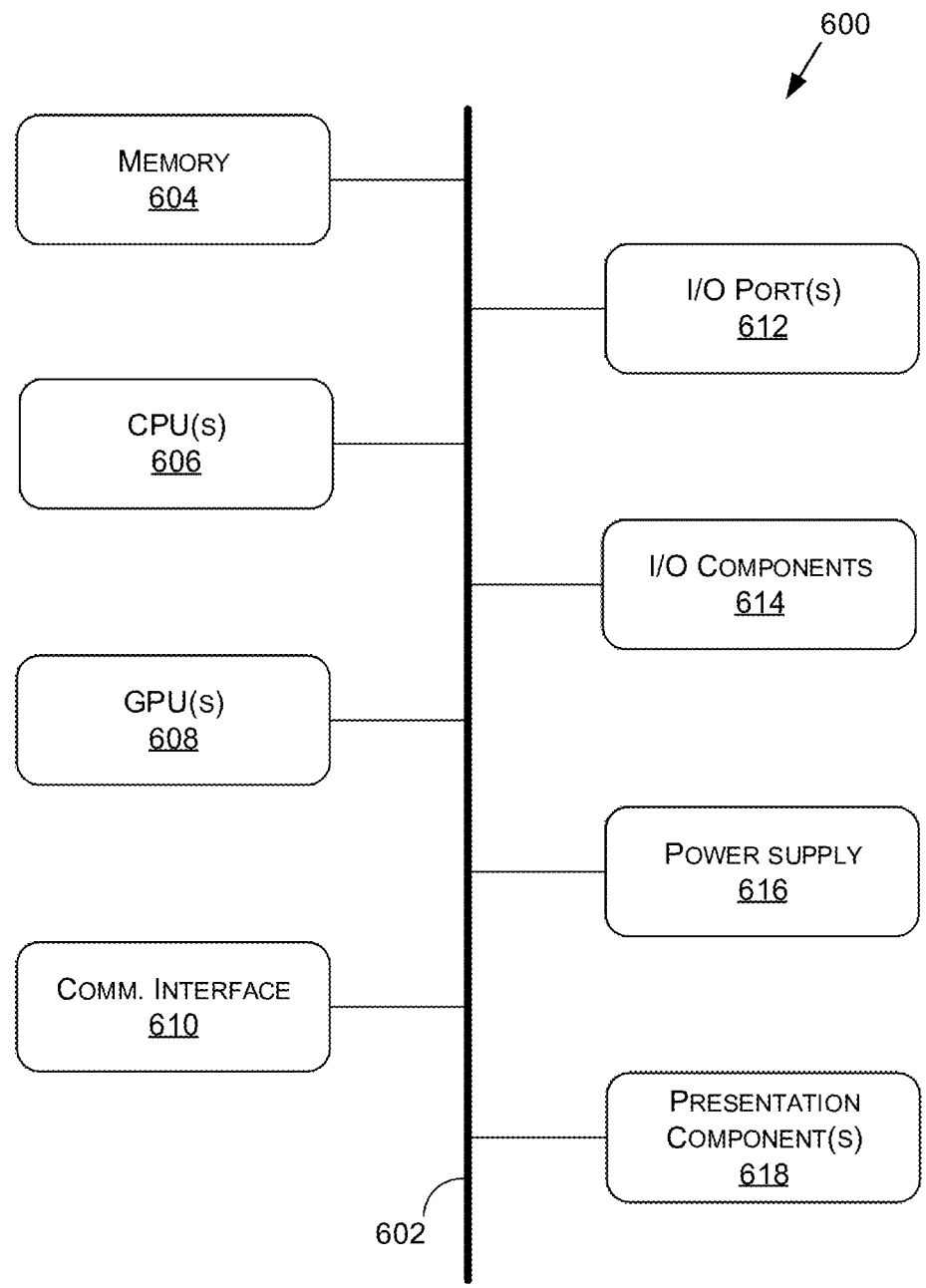
FIG. 6 is a block diagram of an example computing device suitable for use in implementing some embodiments of the present disclosure.

FIG. 6 is a block diagram of an example computing device 600 suitable for use in implementing some embodiments of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link) When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 700 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    receiving first image data representative of a first image generated by a first image sensor with a first field of view during a unit of time and second image data representative of a second image generated by a second image sensor with a second field of view during the same unit of time;
    computing, using a neural network and based at least in part on the first image and the second image, a first disparity map corresponding to the first image and a second disparity map corresponding to the second image;
    computing a first loss based at least in part on comparing the first image and the second image using at least one of the first disparity map or the second disparity map;
    receiving LIDAR data generated by at least one LIDAR sensor during the same unit of time;
    computing a second loss based at least in part on comparing depth values determined from the LIDAR data to predicted depth values determined using at least one of the first disparity map or the second disparity map; and
    updating one or more parameters of the neural network based at least in part on the first loss and the second loss.

2. The method of claim 1, wherein the first image sensor and the second image sensor correspond to one or more stereo cameras.

3. The method of claim 1, wherein the first loss function includes a photometric consistency loss function.

4. The method of claim 1, wherein:
    the neural network includes a first stream of layers corresponding to the first image and a second stream of layers corresponding to the second image; and
    first weights from one or more layers of the first stream of layers and second weights from one or more layers of the second stream of layers are shared during training of the neural network.

5. The method of claim 1, wherein the comparing the first image and the second image using at least one of the first disparity map or the second disparity map includes:
    transforming at least one of the first image using the first disparity map to generate a transformed first image or the second image using the second disparity map to generate a transformed second image; and
    comparing at least one of the first transformed image to the second image using a similarity metric or the second transformed image to the first image using the similarity metric.

6. The method of claim 1, wherein the training the neural network is using unsupervised training with respect to the first loss function and supervised training with respect to the second loss function.

7. A processor comprising:
    processing circuitry to determine depth information using disparity maps computed using a neural network, wherein the neural network is trained based at least in part on:
        computing, using the neural network and based at least in part on a first image and a second image captured at a same time using a stereo camera, a first disparity map corresponding to the first image and a second disparity map corresponding to the second image;
        computing a first loss based at least in part on comparing the first image and the second image using at least one of the first disparity map or the second disparity map;
        receiving LIDAR data generated by at least one LIDAR sensor during the same time;
        computing a second loss based at least in part on comparing depth values determined from the LIDAR data to predicted depth values determined using at least one of the first disparity map or the second disparity map; and
        updating one or more parameters of the neural network based at least in part on the first loss and the second loss.

8. The processor of claim 7, wherein the neural network is trained using semi-supervised learning.

9. The processor of claim 7, wherein the first loss function includes a photometric consistency loss function.

10. The processor of claim 7, wherein:
    the neural network includes a first stream of layers and a second stream of layers; and
    first weights from one or more layers of the first stream of layers and second weights from one or more layers of the second stream of layers are shared to train the neural network.

11. The processor of claim 7, wherein the comparing the first image and the second image using at least one of the first disparity map or the second disparity map includes:
    transforming at least one of the first image using the first disparity map to generate a transformed first image or the second image using the second disparity map to generate a transformed second image; and comparing at least one of the first transformed image to the second image using a similarity metric or the second transformed image to the first image using the similarity metric.

12. The processor of claim 7, wherein the training the neural network is using unsupervised training with respect to the first loss function and supervised training with respect to the second loss function.

13. The processor of claim 7, wherein at least one of the first image or the second image is generated using a virtual simulation.

14. The processor claim 7, wherein the processor is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

15. A system comprising:
a stereo camera;
one or more processing units; and
one or more memory units storing instructions thereon that, when executed using the one or more processing units, cause the one or more processing units to execute operations comprising:
  computing, using a neural network and based at least in part on image data generated using the stereo camera, one or more disparity maps; and
  determining depth information based at least in part on the one or more disparity maps,
  wherein the neural network is trained, at least in part, by:
    computing, using the neural network and based at least in part on a first image and a second image captured at a same time, a first disparity map corresponding to the first image and a second disparity map corresponding to the second image;
    computing a first loss based at least in part on comparing the first image and the second image using at least one of the first disparity map or the second disparity map;
    receiving LIDAR data generated by at least one LIDAR sensor during the same time;
    computing a second loss based at least in part on comparing depth values determined from the LIDAR data to predicted depth values determined using at least one of the first disparity map or the second disparity map; and
    updating one or more parameters of the neural network based at least in part on the first loss and the second loss.

16. The system of claim 15, wherein the neural network is trained using semi-supervised learning.

17. The system of claim 15, wherein:
the neural network includes a first stream of layers and a second stream of layers; and
first weights from one or more layers of the first stream of layers and second weights from one or more layers of the second stream of layers are shared to train the neural network.

18. The system of claim 15, wherein the comparing the first image and the second image using at least one of the first disparity map or the second disparity map includes:
  transforming at least one of the first image using the first disparity map to generate a transformed first image or the second image using the second disparity map to generate a transformed second image; and
  comparing at least one of the first transformed image to the second image using a similarity metric or the second transformed image to the first image using the similarity metric.

19. The system of claim 15, wherein the training the neural network is using unsupervised training with respect to the first loss function and supervised training with respect to the second loss function.

20. The system of claim 15, wherein the system includes at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

* * * * *